United States Patent [19]

Bartheld et al.

[11] 4,362,959

[45] Dec. 7, 1982

[54] ELECTRIC MOTOR ROTOR WITH FITTED VENT SPACERS

[75] Inventors: Robert G. Bartheld; Oscar Rublo-Medina, both of Cincinnati, Ohio

[73] Assignee: Siemens-Allis, Inc., Atlanta, Ga.

[21] Appl. No.: 150,086

[22] Filed: May 15, 1980

[51] Int. Cl.³ .............................................. H02K 9/00
[52] U.S. Cl. .................................... 310/64; 310/211; 310/65
[58] Field of Search ..................... 310/211, 64, 65, 261

[56] References Cited

U.S. PATENT DOCUMENTS

| 854,760 | 5/1907 | Reist | 310/211 |
| 2,944,171 | 7/1960 | Alger | 310/211 |
| 2,956,186 | 10/1960 | Wall | 310/65 |
| 3,123,747 | 3/1964 | Glass | 310/65 X |

Primary Examiner—Donovan F. Duggan
Attorney, Agent, or Firm—Frederick W. Powers, III

[57] ABSTRACT

A rotor having cast squirrel cage windings is provided with a number of spacers for interrupting or spacing the stacked rotor laminations, thus forming vents for cooling. The spacers surround the rotor bars, and have a projection at each side thereof for fitting into the adjacent laminations. The design of the spacers allows them to be narrower than those previously known, thus enhancing air flow through the rotor.

10 Claims, 4 Drawing Figures

ELECTRIC MOTOR ROTOR WITH FITTED VENT SPACERS

BACKGROUND OF THE INVENTION

The present invention relates to dynamoelectric machines, and more particularly to an improved construction for rotors utilizing squirrel cage windings.

In constructing laminated rotors for induction machines, it is common to interrupt the stack of laminations throughout its length in order to form one or more voids in the rotor. The centrifugal force associated with the spinning rotor gives rise to a radial air flow through these voids, or vents, much in the manner of a centrifugal pump or fan.

In order to form the vents metal spacers are conventionally interposed between laminations. The spacers are usually oriented radially within the rotor stacks so as to impede air flow as little as possible, and defining radial vents. The spacers may take a number of forms; in some motor rotors, they are formed of L-shaped metal strips which are resistance welded to ones of the adjacent laminations. However, a problem arises in the construction of rotors using die-cast squirrel cage windings since the molten metal which forms the rotor bars must be confined within the slots in the stack. Therefore, it has become conventional to provide collar-like spacers formed of strips of steel or the like, which are bent into a closed loop which generally conforms to the cross section of the rotor bar. These collars, or spacers, are then individually attached to laminations to form a gap in the laminations to provide the desired vents, and prevents leakage of molten metal when the rotor bars are formed.

Several deficiencies have been noted in this form of construction. The form and location of the spacers being somewhat imprecise, it has been found necessary to make them somewhat larger than the desired cross section of the actual rotor bars. In this manner any improper forming of the vents or spacers, or inaccurate location upon the laminations, will not diminish the effective cross section of the associated rotor bar. Furthermore, attachment of the spacers is a tedious task, requiring special jigs and fixtures in addition to the equipment normally necessary for the spot welding process.

Another, more basic deficiency in presently-used spacers is their size, i.e. the percentage of the rotor vent periphery which they block. This blockage is caused both by the thickness of the metal used to form the spacers, necessary limitations on the configurations into which they can be formed, and the necessary oversized nature of the spacers as discussed above. Accordingly, it will be understood that it would be highly advantageous to provide an improved spacer design for rotors of electric motors using squirrel cage windings.

It is therefore an object of the present invention to provide an electric motor with a spacer having improved ventilating characteristics.

Another object of the invention is to provide a spacer which can be formed according to desired aerodynamic criteria.

Yet another object is to provide a spacer for a rotor which allows the casting of rotor bars without diminished cross sections, yet itself exhibits minimal width.

Yet another object of the invention is to provide improved spacers which can be fitted to rotor laminations without the need for fusion or adhesive bonding.

SUMMARY OF THE INVENTION

Briefly stated, in accordance with one aspect of the invention the foregoing objects are achieved by providing spacers formed of monolithic, uninterrupted material and having an upper portion surrounding a rotor bar and a lower portion which extends radially inwardly toward the center of the rotor. Each spacer is provided with one at least one projection, and one or both of the laminations which lie at either side of the spacer define a depression for receiving the projection in order to locate a spacer. In a presently preferred embodiment, the projection takes the form of an upstanding lip extending about the opening in the spacer and the spacer is formed from electrically conductive material. In this manner, the spacers may be located upon the laminations without welding or adhesives, yet provide an uninterrupted channel in which the rotor bars may be cast substantially without leakage or flashing.

BRIEF DESCRIPTION OF THE DRAWINGS

While the specification concludes with claims particularly pointing out and distinctly claiming the subject matter which is regarded as the invention, it is believed that the invention will be better understood from the following description of a preferred embodiment taken in conjunction with the accompanying drawings in which:

DESCRIPTION OF A PREFERRED EMBODIMENT

Figure 1:
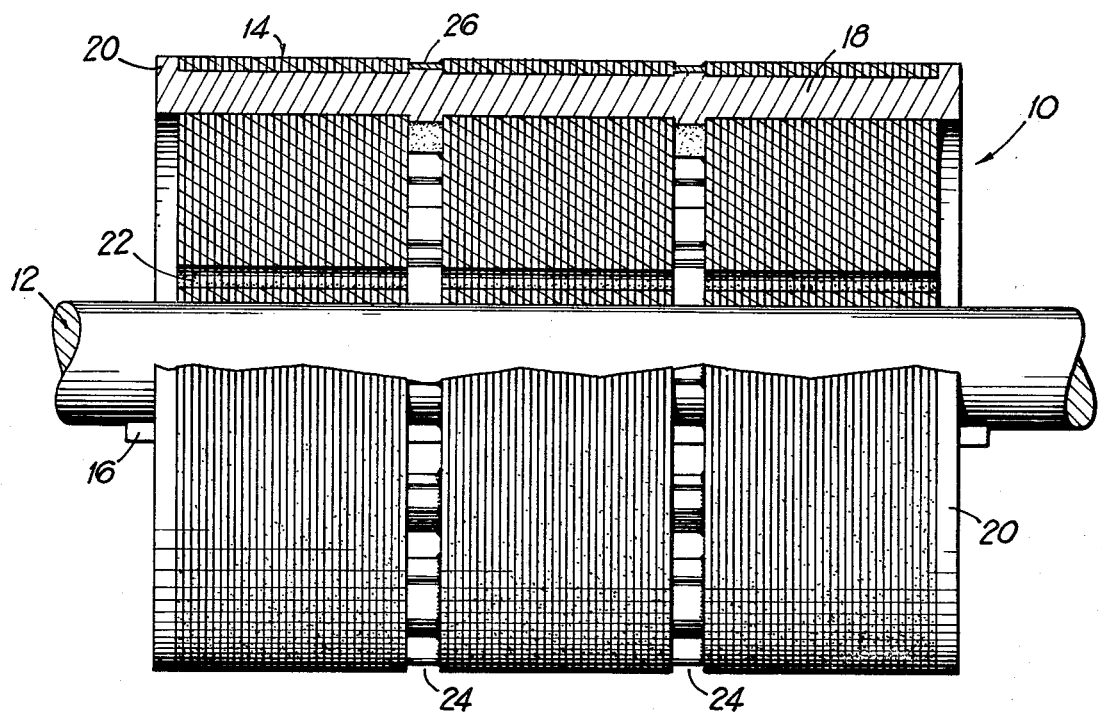
FIG. 1 is a broken-away side elevation of a rotor.

Referring now to FIG. 1, there is shown the rotor of a dynamoelectric machine of the type utilizing a squirrel cage winding. The rotor comprises a shaft 12 which may be journaled in bearings located in the motor end shields (not shown) and a core or stack of laminations disposed 14 thereon. As is familiar to those skilled in the art, the laminations may be press-fitted over the shaft, or located by a key 16.

Extending axially through the rotor stack or core are a plurality of rotor bars, one of which is shown at 18. The bars are electrically connected to, and may be cast integrally with, end rings 20. This is conventionally accomplished by placing the rotor core in a fixture and injecting a molten conductive metal such as aluminum into the rotor, so as to fill the rotor bar passages, and simultaneously into annular molds to form the end rings.

Other openings which extend axially through the rotor are illustrated at 22 and serve to admit ventilating air to the rotor. The air is exhausted radially outwardly through vents 24, which consist of gaps in the rotor core. The gaps are formed by spacers 26 which support confronting laminations and space them apart, thus providing a vent space through the rotor core which extends generally perpendicularly to the axis of shaft 12. It will be appreciated that since rotor bars 18 are cast in place, the channels in which they are formed must somehow be continued despite the gaps which form vents 24 along the axial length of the rotor. Accordingly, the spacers generally take the form of collars formed of strips of sheet metal.

Figure 2:
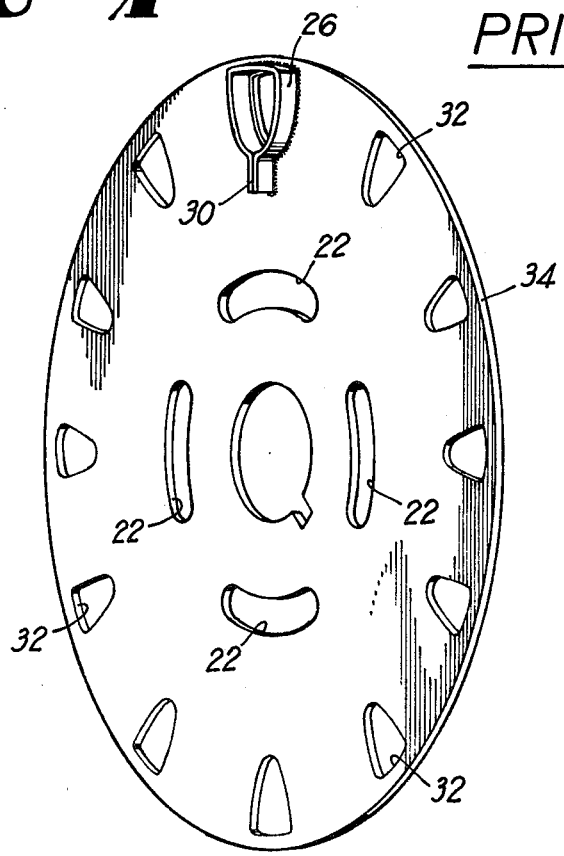
FIG. 2 illustrates a spacer as formed according to the prior art.

FIG. 2 illustrates such a collar-type spacer as used in the prior art. The spacer, shown generally at 26, is formed of a continuous strip of sheet steel which is spot welded together at 30. The spacer forms an opening which is generally the same shape as the rotor bar opening 32 in lamination 34. Owing to the potential for misalignment and tolerances involved in forming the spacer, however, the opening which is defined by the spacer is necessarily somewhat larger than openings 32 which are actually used to form the rotor bars. The spacer and other like it, one for each rotor bar opening, are spot welded to lamination 34 substantially as shown. A second lamination (not shown) may be disposed over the opposite ends of the spacers so as to "sandwich" the spacers between the pair of laminations. Frequently, the laminations which are used are made of a substantially thicker material than the other laminations of the rotor, both for physical strength and to better withstand the spot welding process.

It will now be seen that spacers 26 can be regarded as composed of two parts; a radially outer, or upper, portion which surrounds a rotor bar and a radially inner, or lower portion 30 which is formed by the spot welded ends of the spacer material and which further forms a narrowed "point" of the spacer which somewhat enhances air flow about the spacer, and further provides additional contact area between the confronting rotor laminations. Because of the constant thickness of the spacer material and the need for confining molten rotor bar metal in a predetermined area, it is not feasible to form the spacer in a configuration substantially different from that shown. Moreover, the width of the spacer is significantly greater than that of the rotor bars which cumulatively results in a substantial lessening of vent area.

Figure 3:
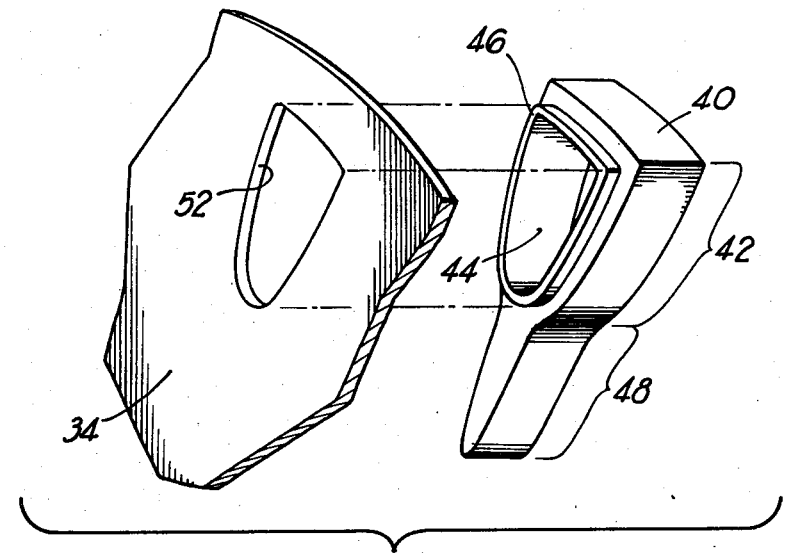
FIG. 3 illustrates one embodiment of the present invention.

An improved spacer formed according to the present invention shown in FIG. 3. The spacer generally indicated at 40 is preferably formed from a process such as die casting so as to provide a monolithic element, that is, one which has no breaks or seams in its structure. The radially outer portion 42 of the spacer is formed in generally the same shape as the cross-sectional shape of the rotor bar to be formed within it. The spacer further defines an opening 44 which becomes a portion of the channel in which the rotor bar is to be cast. A projection 46, here shown as a ridge or lip, extends outwardly from the end surface of the spacer, about the edge of opening 44. The width of projection 46 is made as small as feasible so that the overall transverse thickness of the spacer can be minimized.

The lower, radially inner section 48 of the spacer is not constrained to follow any particular form, and may be designed in accordance with principles of aerodynamics so as to minimize resistance to radial air flow and/or to minimize noise.

The lamination 34 which confronts spacer 40 is provided with rotor bar openings, one of which is shown at 52. The openings generally conform to the desired cross section of the rotor bars, and closely receive projection 46. In a preferred embodiment the rear side (not shown) of spacer 40 is provided with a projection like that illustrated at 46 and receives a second lamination (also not shown) to form a "sandwich" structure. By forming openings 52 and projections 46 so that they interfere slightly, a tight fit may be provided which holds the spacers and confronting rotor laminations together so that they may be assembled into the rotor stack without the need for spot welding or adhesive. After the rotor is stacked, the compressive forces which hold the rotor together maintain the confronting laminations tightly against the spacers.

Figure 4:
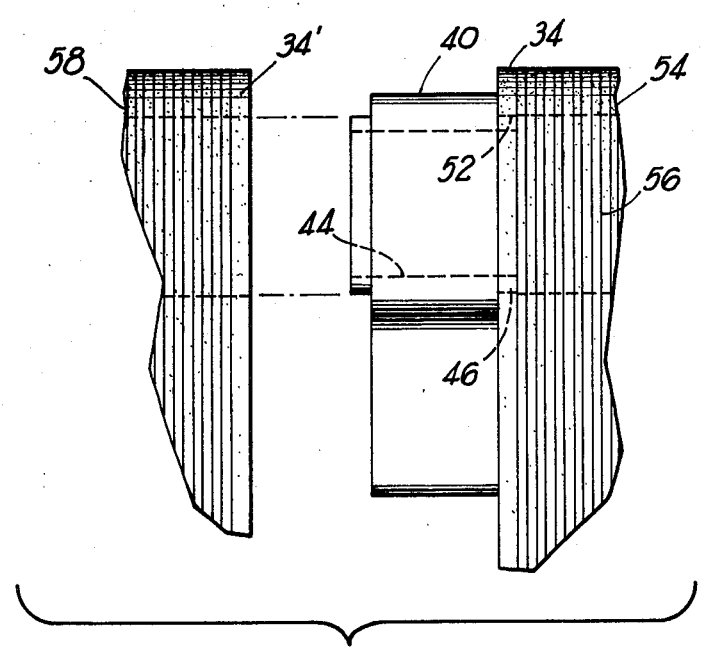
FIG. 4 illustrates the manner of assembly of elements formed according to the invention.

Turning now to FIG. 4 a portion of a rotor constructed according to the invention is shown in partly separated form. A portion 54 of a rotor stack terminates in an extra-thick lamination 34 which tightly receives production 46 of spacer 40. The outer dimension of the spacer is substantially coincident with the mating passage 56 which extends through lamination 54, and within which a rotor bar will be cast.

In like manner, a continuation 58 of the stack of laminations terminates in an extra-thick lamination 34' having an oversized opening for receiving a mating projection from spacer 40. When the spacer is mated with lamination 34', a continuous passage is then formed within which a rotor bar having a substantially constant cross section may be cast.

In the embodiment of the invention shown in FIGS. 3 and 4, projection 46 is fitted into passages 56 in the rotor so that the opening 44 through the spacer is somewhat smaller than the passages. According to a preferred form of the invention, spacer 40 is formed of an electrically conductive material such as aluminum, aluminum alloy, copper or copper alloy. When rotor bars are cast in place, passages 56 are filled with the conductive metal. As this metal, which forms the rotor bars, is in intimate contact with spacers 40 the spacers in effect become part of the associated rotor bar, and in part conduct the current which flows through the bar. In this manner, although the openings in the spacers are smaller than the rotor bar passages in the laminations, the spacers in effect maintain the electrical continuity of the rotor bars so that the effective cross section of the bars does not decrease as they traverse the rotor vents.

Further, once the invention is understood it will be appreciated that ridge 46 need not extend completely around opening 44. The principal purpose of ridge 46 (or portions thereof) is simply to locate the spacer in the adjacent lamination until axial compression can be applied to the rotor. If the ends of the spacers fit flush against the lamination surfaces, only a small portion or portions ridge 46 need be present. For instance, a pair of projections lying at opposite sides of opening 44 may be adequate for purposes of locating the spacer, the ends of the spacer fitting closely enough against the laminations so that upon casting of the rotor bar little if any of the molten metal escapes into the vent arm.

It will also be readily appreciated that if the spacers are formed of a material which has a substantially lower conductivity than the rotor bar material, it will be desirable for the passage therethrough to approximate the size of the rotor bar passage 56 in the rotor laminations, so that the area of the rotor bar is not "necked down" as it passes through the vent areas of the rotor.

It will now be appreciated that there has been disclosed herein an improved spacer construction for electric motor rotors having squirrel cage windings. Owing to the manner of forming the spacers, they can be provided with practically any desired configuration to achieve improved aerodynamic qualities. Further, radially outer part of the spacer can be considerably thinner than those heretofore used, with the result that a narrower spacer is provided and air flow characteristics are improved.

While it will be seen that the spacers may be formed in a number of ways, it is presently believed that the most economical manner of forming them is a die casting process using aluminum or copper alloys or other appropriate material. Materials such as copper and aluminum could not be used with the prior art method of fastening spacers to laminations by spot welding, and provide the additional advantage of transferring heat readily, thus further enhancing the cooling action of the vents.

It will be evident from the foregoing description that certain aspects of the invention are not limited to the particular details of the example illustrated. It is contemplated, therefore, that other modifications or applications of the invention will occur to those skilled in the art. For this reason, it is intended that the following claims shall cover all such modifications and applications as do not depart from the true spirit and scope of the invention.

What is claimed as new and desired to be secured by Letters Patent of the United States is:

1. In a dynamoelectric machine including a rotor having a plurality of rotor bars arranged in a generally circular array and extending axially through said rotor, said rotor being formed of a stack of laminations, said laminations being axially spaced at at least one point along the stack to form a vent extending in a plane perpendicular to the axis of the rotor, a plurality of spacers disposed between confronting laminations to space said laminations apart to thereby form the vent;

said spacers having substantially flat, parallel opposed end surfaces and having an opening extending therethrough for receiving rotor bar material, said spacers further comprising a radially outer portion surrounding a rotor bar and a radially inner portion extending radially inwardly from said rotor bar, said spacers each having a projection upstanding from at least one of said flat end surfaces, at least one of the laminations confronting said spacers having a depression therein for receiving said projection.

2. The invention defined in claim 1 wherein said projection is comprised of an upstanding ridge extending about at least a portion of the periphery of the rotor bar opening.

3. The invention defined in claim 2, wherein the depression defined by a lamination is constituted by an enlarged rotor bar opening, said opening being formed to receive said projection.

4. The invention defined in claim 3, wherein said spacers are formed of cast metal.

5. The invention defined in claim 4, wherein said spacers are comprised of aluminum.

6. The invention defined in claim 4, wherein said spacers are comprised of copper.

7. The invention defined in claim 3, wherein said ridge extends about substantially the entire periphery of the rotor bar and upon opposite sides of said spacers, and wherein both of said confronting laminations are provided with enlarged rotor bar openings for receiving said ridges.

8. An improved spacer for separating confronting laminations in an electric motor rotor of the type provided with cast-in-place rotor bars, comprising a monolithic metal member having an opening therein which is smaller in area than the cross-sectional area of said rotor bars, said spacer having substantially flat opposed ends for bearing against adjacent laminations, at least one of said ends having a projection extending adjacent said opening for fitting into a mating depression in at least one of the confronting laminations.

9. The invention defined in claim 8, wherein said spacer is comprised of an upper part for substantially surrounding a rotor bar and a lower part for extending radially inwardly of the rotor, and said projection comprises a ridge for extending adjacent said rotor bar and fitting within a rotor bar opening in a confronting lamination.

10. The invention defined in claim 9, further including a second ridge disposed upon the opposite side of said spacer from said first-named ridge.

* * * * *